SINGLE DISC FILE MEMORY SYSTEM

Filed July 5, 1968 3 Sheets-Sheet 1

INVENTOR
MAX SCHOLZ
BY Frank B. Hill
ATTORNEY

INVENTOR
MAX SCHOLZ
BY
Frank B. Hill
ATTORNEY

INVENTOR
MAX SCHOLZ
BY Frank B. Hill
ATTORNEY

United States Patent Office 3,553,663

Patented Jan. 5, 1971

3,553,663

SINGLE DISC FILE MEMORY SYSTEM

Max Scholz, Detroit, Mich., assignor to Ex-Cell-O Corporation, Detroit, Mich.

Filed July 5, 1968, Ser. No. 742,889
Int. Cl. G11b *1/02, 5/54*
U.S. Cl. 340—174.1 13 Claims

ABSTRACT OF THE DISCLOSURE

A single disc file memory system which can be utilized by interchanging magnetic disc members carried in a cover assembly and having stationary magnetic head assemblies to act on the recording disc surface when the system is operating. The magnetic recording disc is driven by a motor assembly which provides for most of the dimension changes in the motor's rotary shaft to take place at the end of the rotary shaft away from the recording disc so that the magnetic head assembly will act on the disc's magnetic surface which is positioned at substantially the same position in all recording, reading or erasing operations. The disc file memory system provides for a head mounting plate which retracts the heads during non-operation and moves the heads to operating position in a controlled manner when the motor is started. A flow control plate is mounted on the head mounting plate and is positioned between the head mounting plate and the magnetic recording disc to protect the magnetic head assembly when the cover assembly including the recording disc is removed from the disc file memory system.

The present invention relates generally to a new and improved disc file memory assembly and in its specific embodiment discloses a single disc file memory system having readily exchangeable magnetic disc file memory means.

As the computer industry and its related product lines and services have continued to develop and expand there has been a continual changing and increasing need for memory systems with various and different capacities. This changing of features and demands have included large mass memory systems for large computers for individual users and at central points for numerous users and smaller lower capacity systems for use separately and in conjunction with the large memory units or with decentralized central units working at auxiliary stations.

As new uses, purposes and demands are placed upon the memory systems it has also proved advantageous at times to provide inter-changeable disc file units which can be easily, quickly and accurately secured in a memory system giving greater flexibility and inter-changeability when utilizing a small capacity single disc file unit.

The major objective of the present invention is to provide a single disc file unit which can operate accurately and maintain a substantial accurate position between the read, write and erase head and the recording surface even if the ambient conditions change.

A further object of the present invention is to provide a single disc file memory system where the disc file can be easily placed into and out of recording position in the system.

Another further object of the present invention is to provide a disc file memory system having an easily interchangeable disc file which provides protection of the read, write and erase heads when the recording disc member is being changed.

Still another object of the present invention is to provide an inter-changeable single disc file memory unit functioning in a memory system where the drive motor will maintain the memory disc surface in substantially a predetermined axial location and any expansion or change of dimension caused in the motor shaft will be absorbed at the end of the motor shaft which is the end opposite the disc mounting end of the motor shaft leaving a single disc file at its predetermined axial position.

Still another further object of the present invention is to provide a single disc file unit in a memory system having a plate member in juxtaposed position to the memory disc file creating a laminar flow pattern between the plate member in the memory disc surface so that a stable substantially constant pattern will develop which the read, write and erase head will flow on to position itself in proper operating position with respect to the recording surface.

To the accomplishment of the foregoing and related ends, the invention, then consists of the features hereinafter fully described and particularly pointed out in the claims, the annexed drawings and the following description setting forth in detail certain illustrative embodiments illustrating, however, but some of the various ways in which the principle of the present invention may be used.

Figure 3:
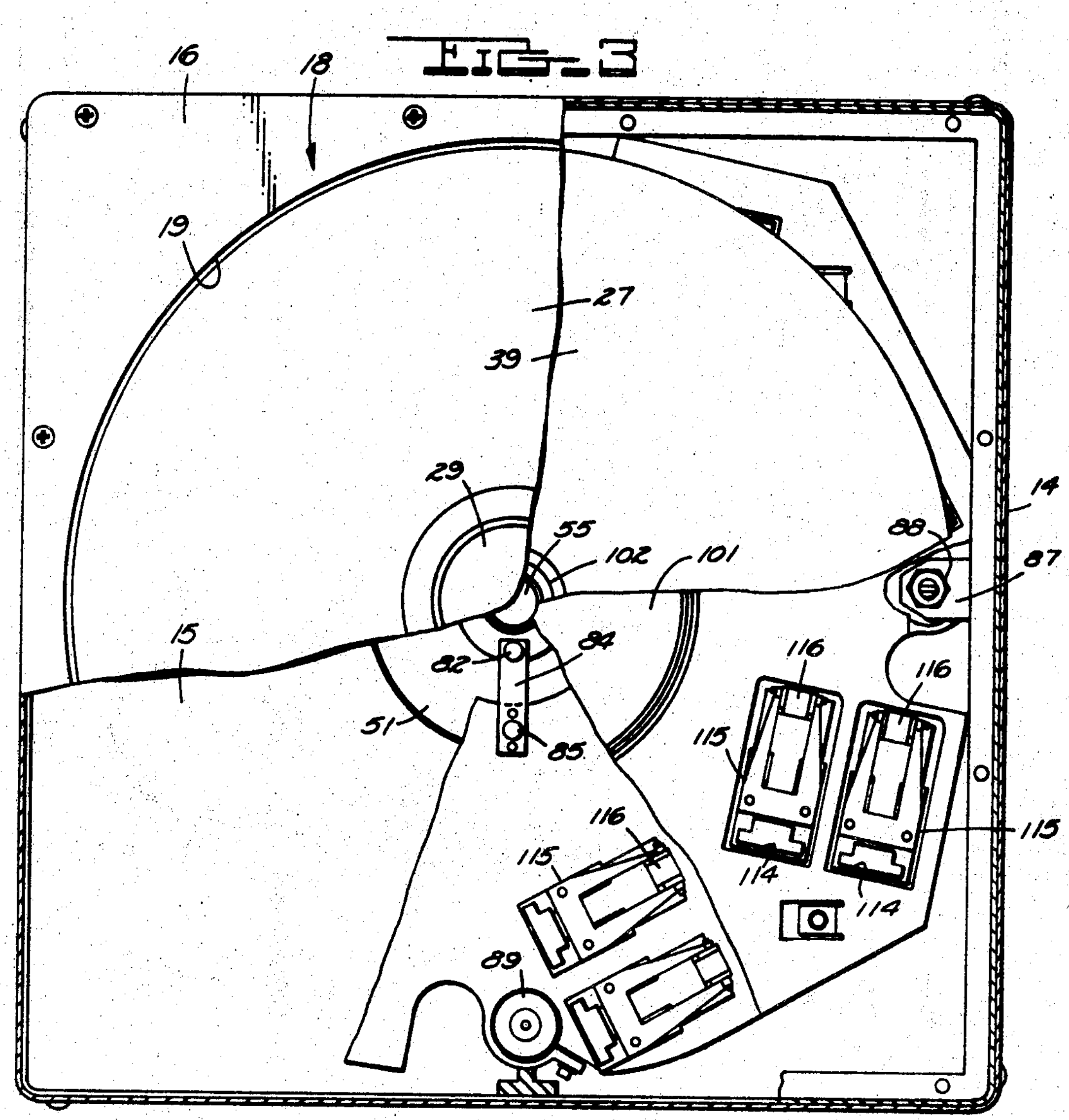
FIG. 3 is a partial sectional top plan view of the cabinet assembly of FIGS. 1 and 2 showing the various levels of the system and illustrating the principles of the present invention.
Figure 1:
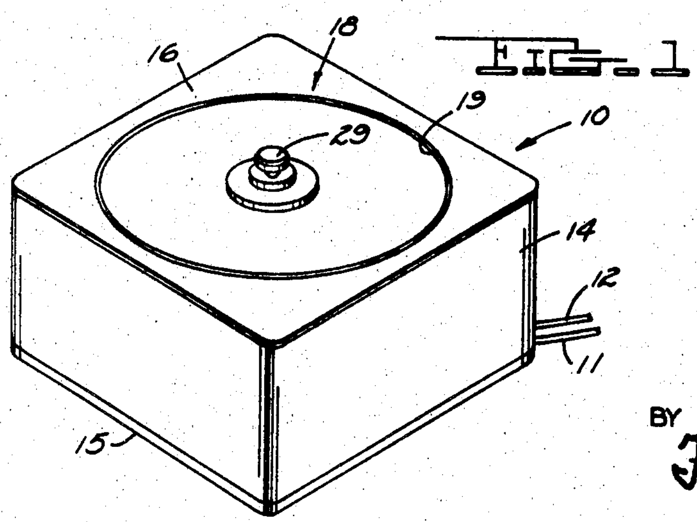
FIG. 1 is a perspective view of a cabinet assembly having a single disc file memory system which illustrates the principles of the present invention.

Referring generally to the drawings, there is illustrated a cabinet assembly indicated by the numeral 10 having power lines 11 and computer connecting lead lines 12 extending from and connecting it to a power source and a computer device, neither of which is shown. The cabinet assembly 10 includes a body member 14, a bottom plate 15 and a top plate 16 with a cover assembly 18 mounted on the cabinet assembly 10 and positioned through an opening 19 provided in top plate 16.

Figure 2:
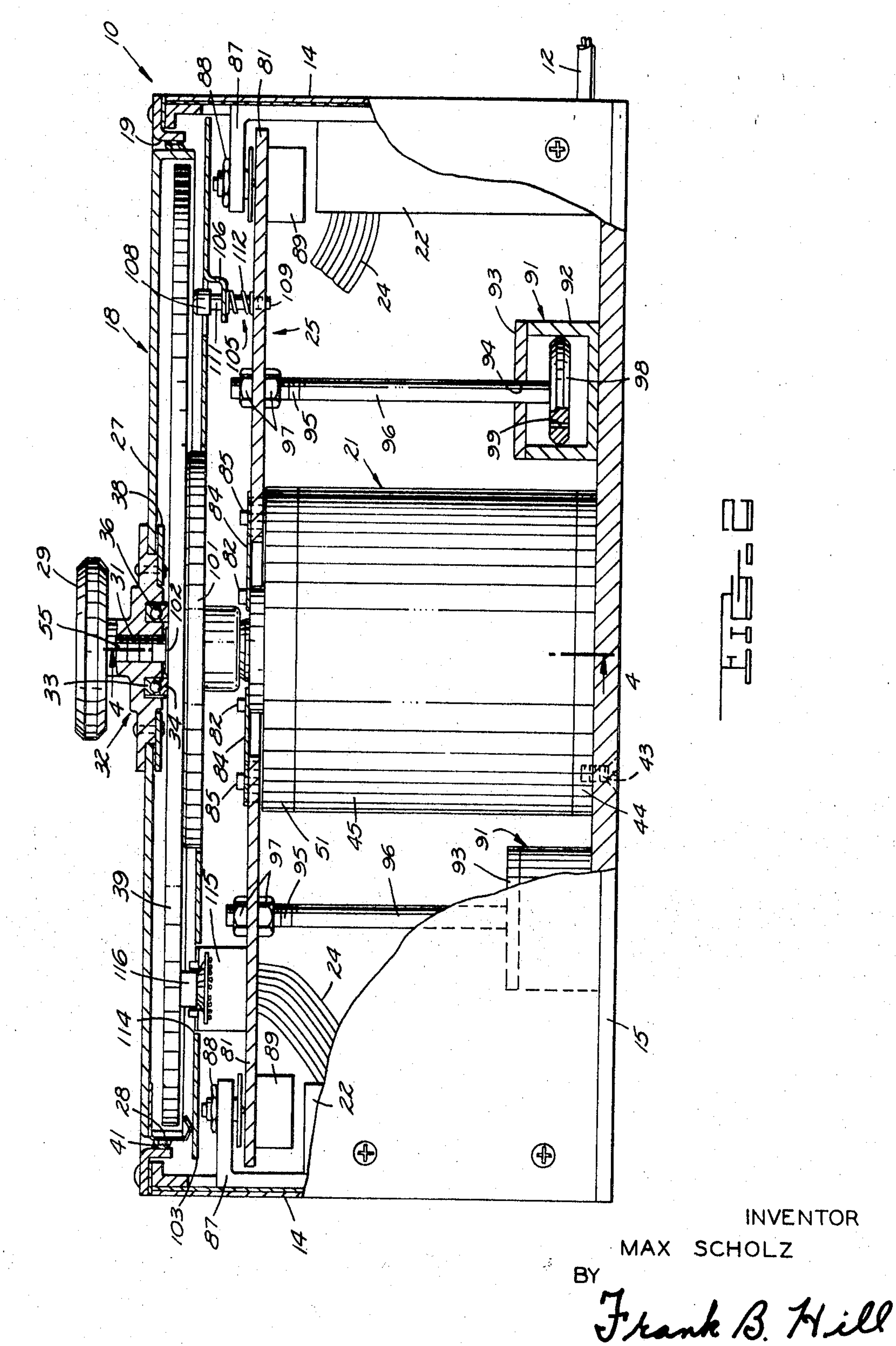
FIG. 2 is a partial cross-sectional view of the cabinet assembly shown in FIG. 1 and illustrating the principles of the present invention by showing the mounting arrangements and control features of this disclosure.

Referring generally to FIG. 2, the cabinet assembly 10 has a motor assembly 21 mounted substantially in its central portion of bottom plate 15 and various electrical signal controls 22 mounted on the inside of body member 14. The electrical signal controls 22 are connected with the computer connecting lead lines 12 and have signal lines 24 which extend from the two other portions of the cabinet assembly 10, as will be explained in more detail below. A supporting and activating assembly 25 is mounted in the upper portion of the cabinet assembly 10 above the motor assembly 21 and between it and the cover assembly 18 located in the opening 19.

The cover assembly 18 is provided with a cover member 27 which has a series of locator clips 28, only one being illustrated, connected to it and mounted at various positions around its circumference. A retainer knob 29 is positioned in substantially the middle portion of cover assembly 18 and extends above the top plate 16 as viewed best in FIG. 2. The retainer knob 29 has a threaded bore 31, the full function of which will be explained in more detail below. A bearing assembly 32 is provided in the end of retainer knob 29 and is substantially aligned with the threaded bore 31.

The bearing assembly 32 has a top race 33 and a bottom race 34 which are rotatably mounted in the retainer knob 29 by a securing member 36. A retaining flange 38 is mounted on the retainer knob's 29 end and holds the cover member 27 in a located relationship to the retainer knob 29.

A recording disc 39 is housed in and retained by the cover assembly 18 by the locator clips 28. The opening 19 has a seal member 41 which extends around the internal circumference of the opening 19 and acts on the cover member 27 to prevent materials from passing into the cabinet assembly 10 during operation.

Figure 4:
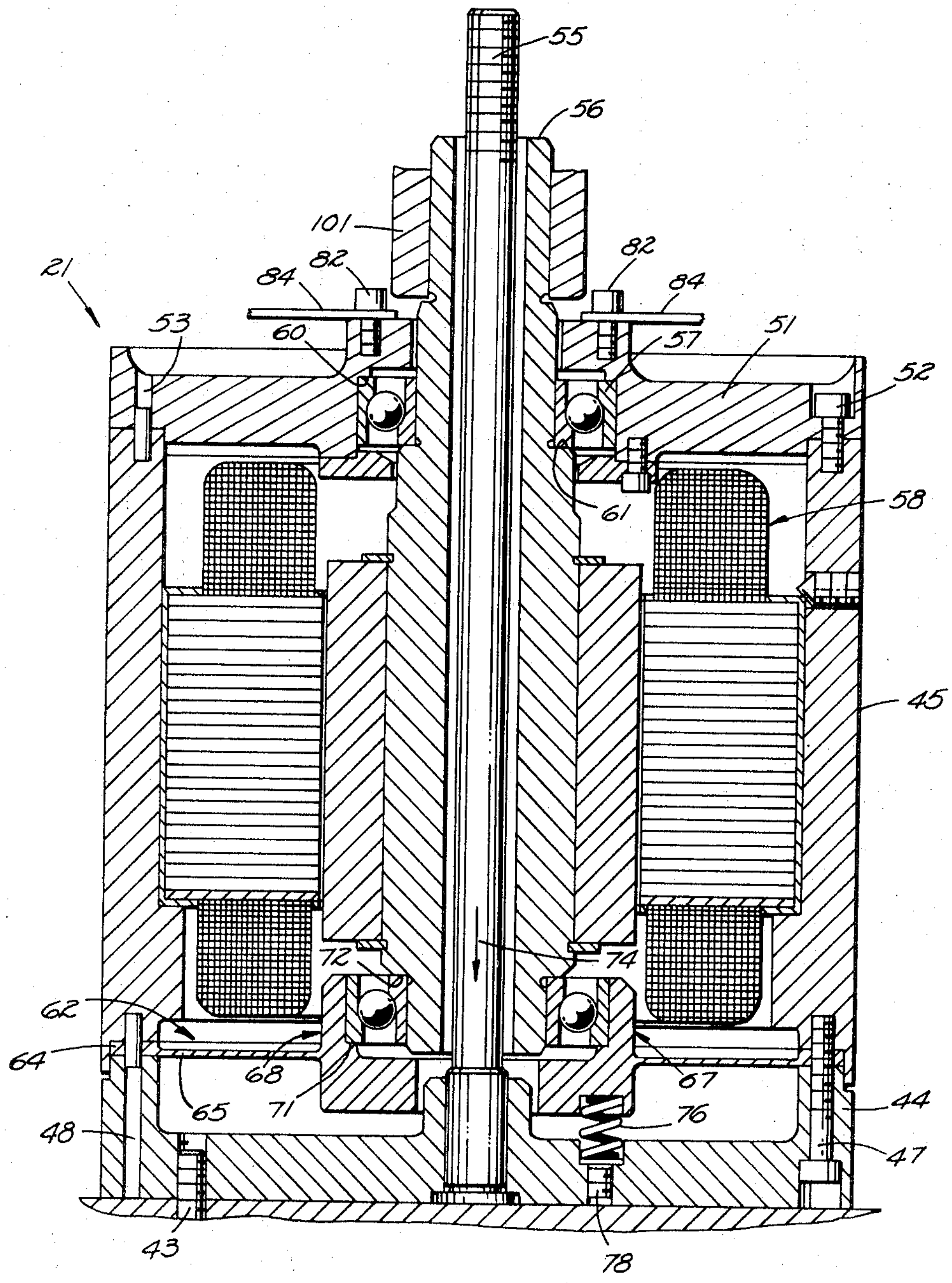
FIG. 4 is a partial sectional view of the motor assembly showing the mounting arrangement of the present motor unit and taken generally along and looking in the directions of the arrows of line 4—4 of FIG. 2.

Referring generally to FIG. 4, the motor assembly 21 is mounted to the bottom plate 15 by one or more securing screws 43, only one being shown in FIGS. 2 and 4. The securing screws 43 pass through the bottom plate 15 and extend into a motor base plate 44. A motor body 45 is positioned to the motor base plate 44 by a series of securing bolts 47 which are aligned by use of a locating pin 48 passing between the motor base plate 44 and the motor body 45. A top plate 51 is secured to the upper end of motor body 45 by securing bolts 52 and located with respect to the body member 45 by locating pins 53 passing between the top plate 51 and the motor body 45. The motor assembly 21 has a fixed rod 55 which is stationary and securely mounted in the motor base plate 44 and passes through the motor assembly 21. The fixed rod 55 extends through a hollow rotating motor shaft 56 of the motor assembly 21. The hollow rotating motor shaft 56 is positioned with respect to a motor unit 58 by means not discussed in this specification but which is well known in the electric motor art.

A thrust bearing 57 acts on the upper end of rotating motor shaft 56 at a locating surface 61 and a stop surface or step 60 of top plate 51. A bearing support member 62 is positioned at the bottom end of rotating motor shaft 56 of motor assembly 21 between the motor body 45 and the motor base plate 44 by an outer flange 64. A bearing housing 67 substantially aligned and concentric with the rotating motor shaft 56 is part of the bearing support member 62 and connects with the outer flange 64 by a diaphragm spring or a series of leaf springs, generally referred to by numeral 65.

A bearing assembly 68 is positioned in the bearing housing 67 on a locating surface or step 71 and acts on the rotating motor shaft 56 at a support surface 72. When the motor assembly 21 is operating, if the rotating motor shaft 56 expands, the thrust bearing 57 will remain substantially at its present position between the stop step 60 and the locating surface 61 and any expansion of the shaft 56 will be taken up at the bottom end of the shaft 56 by permitting the support surface 72 to act on the bearing assembly 68 which in turn will act on the locating step 71 moving the bearing housing 67 generally in the direction of arrow 74 because of the spring leaf 65 arrangement. The movement permitted by the leaf springs 65 also permits the reverse movement when the motor assembly 21 is turned off permitting the heat to dissipate causing the rotating motor shaft 56 to return to its non-operating length by the action spring leafs 65. The bearing housing 67 is preloaded against the support surface 72 of the rotating motor shaft 56 by a series of coil springs 76, only one being illustrated, which extend around its bottom end. These coil springs 76 are preloaded by load screws 78.

The supporting and actuating assembly 25 is provided with a head mounting plate 81 which is mounted to the upper end of the motor assembly 21 at the top plate 51 by a series of mounting bolts 82. Resilient leaf members 84 which are connected to the head mounting plate 81 by a series of securing bolts 85 act between the head mounting plate 81 and the mounting bolts 82. L-shaped stop members 87 are mounted in the cabinet assembly 10 and positioned about the body member 14. Adjustable stops 88 are provided on the L-shaped stop members 87. Solenoids 89 are mounted to the head mounting plate 81 adjacent the adjustable stops 88 and when the motor assembly 21 is stopped they are activated to move the head mounting plate 81 away from the cover assembly 18, and when the motor assembly 21 is started and running they are activated to bring the head mounting plate 81 back toward the cover assembly 18, as will be explained in more detail below.

In some embodiments dash pot assemblies 91 are provided in the cabinet assembly 10 and in the usual embodiment when dash pot assemblies are used there will be one dash pot assembly 91 working in conjunction with each solenoid 89. The dash pot assembly 91 has a cylinder 92 which is mounted to the bottom plate 15. A top member 93 is provided on the cylinder 92 and has an opening 94 which receives a rod member 96. The rod member 96 has a threaded end 95 which passes through the head mounting plate 81 and is connected to the head assembly plate 81 by a pair ot securing and positioning nuts 97.

At the opposite end of the rod member 96 opposite the threaded end 95 is a piston 98 which has an orifice 99. In the applications when the dash pot asssembly 91 is utilized there is oil provided in the cylinder 92 and when the solenoid 89 is deactivated and attempts to permit the head mounting plate 81 to move back up to its up position toward the cover assembly 18, the dash pot assembly 91 by the piston 98 and the orifice 99 will prevent any slamming from taking place by the recording head which would do any damage to the recording disc 39, as will be explained in more detail below.

A drive plate 101 is securely mounted to the upper end of rotating motor shaft 56 and has a centering extension 102. This can be accomplished in various ways well known in the art. When the retainer knob 29 is turned down by having its threaded bore 31 act on the threaded end of fixed rod 55, the bottom race 34 will act on the recording disc 39 securing on the centering extension 102 and moving it in frictional contact with the drive plate 101. When the motor assembly 21 is turned on, the recording disc 39 is centered by the centering extension 102 and the drive plate 101 will act on the recording disc 39 to rotate it in the direction desired. This rotation will be permitted by the fact that the recording disc 39 contacts the centering extension 102 and does not contact the fixed rod 55. The rotating movement is permitted by the bearing assembly 32 applying the frictional pressure between the recording disc 39 and the drive plate 101.

A flow control plate 103, as illustrated in FIG. 2, is mounted to the head mounting plate 81 by a series of bolt members 105, only one is shown. The flow control plate 103 has a series of support flanges 106, only one is shown, which receive the bolt members 105. The bolt members 105 have heads 108 at one end and threaded ends 109 at the opposite end. The main body of the bolt member is made up of a guide surface 111 which connects the head 108 and the threaded end 109.

The support flange 106 has an opening, not shown, which receives the guide surface 111 and is substantially the same size. A return spring 112 has the guide surface of the bolt member 105 pass through it and is positioned between the support flange 106 and the head mounting plate 81. The bolt members 105 are secured in the head mounting plate 81 by having their threaded ends 109 turned into a threaded bore, not shown, in the mounting plate 81. The return spring 112 is biased in the up position tending to move the flow control plate 103 away from the head mounting plate 81 and when the cover assembly 18 is removed from the cabinet assembly 10, the return spring 112 will cause the flow control plate 103 to move in an up direction.

Head openings 114, only one being shown as seen in

FIG. 2, are provided in the flow control plate 103 and a series of head assemblies 115, only one being shown, are mounted on the head mounting plate 81 and aligned with the head openings 114 so that a core pad 116 can be positioned into close proximity of the recording disc 39 so that when the cabinet assembly 10 is operating various bits of information can be received from and sent to a computer unit, not shown, through the computer connecting lead lines 12. This signal arrangement is a practice well known in the computer art.

The flow control plate 103 will move to its up position when the cover assembly 18 is removed from the cabinet assembly 10. In this position the flow control plate 103 will extend past the core pad 116 to provide protection to the head assembly 115 from inadvertent damage. As a cover assembly 18 is placed back on fixed rod 55 of the cabinet assembly 10 the locator clips 28 will contact the flow control plate 103 to move it to its down position on the guide surface 111 away from the opening 19 by compressing the return spring 112. Of course, when the cover assembly 18 is either placed on the fixed rod 55 or removed from it, the motor assembly 21 will be turned off at which time the solenoids 89 will be activated to have removed the head assembly 115 and the core pad 116 away from their operating position with respect to the recording surface of recording disc 39.

As the cabinet assembly 10 is placed into operation and initially started, the dash pot assembly 91 will prevent the head mounting plate 81 from moving from the retracted position to the operating position too quickly. This prevents the core pad 116 from slamming into operating position with the recording disc 39. This is accomplished by the dash pot assembly 91 as explained above and in a standard manner well known in the dash pot art where the piston 98 will move up passing oil between its outer edge and the inner surface of the cylinder 92 and through the orifice 99. As stated above, the various dash pot assemblies 91 can be positioned around the motor assembly 21 in a uniform manner and connected to the head mounting plate 81 so as to permit a smooth and even movement of the head mounting plate 81 from the non-operative position to the operative position.

In this preferred embodiment a flow control plate is illustrated but in all applications the flow control plate 103 may not be required. One of its advantages as stated above is to protect the core pad 116 and the head assembly 115 from damage when the cover assembly 18 is removed. Another advantage is that it helps prevent dust and other particles from easily passing into the internal portion of the cabinet assembly 10 when the cover assembly 18 is off. When the cabinet assembly 10 is in operating condition as viewed in FIG. 2, the flow control plate 103 can help create a control film layer on the recording surface of the rotating recording disc 39 to give the core pads 116 a stable air layer to ride on. As is well known in the art, core pads, such as core pads 116, may be of the flying head variety making their contact between the recording disc on the laminar film between the core elements, not shown, which are mounted in the core pad and the recording surface of the recording disc 39. The flow control plate 103 prevents and helps control any eddy currents from developing which would adversely affect the controlled spacing between the recording surface of the recording disc 39 and the recording head generaly referred to as head assembly 115.

It will be seen from the above that simple and inexpensive, yet practical and durable means have been disclosed for obtaining the desired ends. Attention is again invited, however, to the possibility of making variations within the spirit and scope of the invention set forth. Also, directional terms such as inwardly, lower, vertical, upwardly, downwardly, etc. have been used to facilitate explaining the invention in the position shown in the drawings and are not to be considered as limiting the scope of the disclosed invention.

Other modes of applying the principles of my invention may be employed, instead of those explained, change being made as regards the mechanism herein disclosed, provided the features stated by any of the following claims or the equivalent of such stated features be employed.

I therefore particularly point out and distinctivity claim as my invention:

1. A disc file memory system providing in combination:
(a) a cabinet assembly having a bottom plate, a top plate and a connecting body member;
(b) a motor assembly positioned within said cabinet assembly and mounted on said bottom plate;
(c) said motor assembly having a rotating motor shaft;
(d) a recording disc mounted on said rotating motor shaft;
(e) a head mounting means mounted adjacent said recording disc;
(f) at least one magnetic head assembly mounted on said head mounting means;
(g) moveable means to move said head mounting means to a predetermined operating position toward said recording disc when said motor assembly is turned on and to a retracted position away from said recording disc when said motor assembly is turned off;
(h) a motor body as part of said motor assembly;
(i) a motor top plate mounted on said motor body and positioned in close proximately to said drive plate;
(j) a motor base plate mounted at the opposite end of said motor body;
(k) said motor top plate acting on and housing a secured thrust bearing located off said rotating motor shaft;
(l) a bearing support member positioned by the said motor base plate and said motor body;
(m) said bearing support member having an outer flange and an inner bearing housing;
(n) a resilient means connecting said outer flange and said inner bearing housing;
(o) said bearing housing having a locating step and said rotating motor shaft having a support surface; and
(p) a bearing assembly positioned between said support surface and locating step.

2. A disc file memory system as defined in claim 1, having in combination:
(a) a diphragm spring member acting as said resilient means.

3. A disc file memory system as defined in claim 2, having in combination:
(a) a resilient spring means acting between said motor base plate and said bearing housing; and
(b) an adjustment means to act on said resilient spring means to apply a predetermined pressure on said bearing housing.

4. A disc file memory system providing in combination:
(a) a cabinet assembly having a bottom plate, a top plate and a connecting body member;
(b) a motor assembly positioned within said cabinet assembly and mounted on said bottom plate;
(c) said motor assembly having a rotating motor shaft;
(d) a recording disc mounted on said rotating motor shaft;
(e) a head mounting means mounted adjacent said recording disc;
(f) at least one magnetic head assembly mounted on said head mounting means;
(g) movable means to move said head mounting means to a predetermined operating position toward said recording disc when said motor assembly is turned on and to a retracted position away from said recording disc when said motor assembly is turned off;
(h) a motor body as part of said motor assembly;

(i) a drive plate mounted on said rotating motor shaft;
(j) a motor top plate mounted on said motor body and positioned in close proximity to said drive plate;
(k) a motor base plate mounted at the opposite end of said motor body;
(l) said motor top plate acting on and housing a secured thrust bearing located off said rotating motor shaft;
(m) a bearing support member positioned by the said motor base plate and said motor body;
(n) said bearing support member having an outer flange and an inner bearing housing connected by leaf springs;
(o) said bearing housing having a locating step and said rotating motor shaft having a support surface;
(p) a bearing assembly positioned between said support surface and locating step;
(q) at least one coil spring acting between said motor base plate and said bearing housing; and
(r) said motor base plate having a load screw which can act on said coil spring to apply a predetermined pressure on said bearing housing.

5. A disc file memory system as defined in claim 4, having in combination:
(a) a flow control plate mounted between said head mounting means plate and said recording disc; and
(b) said flow control plate having head openings to permit said magnetic head assembly to be positioned at said predetermined operating position in recording relationship to said recording disc.

6. A disc file memory system as defined in claim 5, having in combination:
(a) an opening in said top plate;
(b) a cover assembly positioned in said opening;
(c) said cover assembly having a cover member with a retainer knob positioned substantially at its central portion;
(d) said motor assembly having a fixed rod aligned with and eccentric with said rotating motor shaft and extending through said recording disc;
(e) said retainer knob having a bearing assembly positioned to make contact with said recording disc;
(f) said retainer knob having a threaded bore to act on a threaded end of said fixed rod;
(g) a drive plate mounted on said rotating motor shaft and making contact with said recording disc; and
(h) said retainer knob being secured on said fixed rod and securely positioning said recording disc between said bearing assembly and said drive plate.

7. A disc file memory system providing in combination:
(a) a cabinet assembly having a bottom plate, a top plate and a connecting body member;
(b) a motor assembly positioned within said cabinet assembly and mounted on said bottom plate;
(c) said motor assembly having a rotating motor shaft;
(d) a recording disc mounted on said rotating motor shaft;
(e) a head mounting means mounted adjacent said recording disc;
(f) at least one magnetic head assembly mounted on said head mounting means;
(g) moveable means to move said head mounting means to a predetermined operating position toward said recording disc when said motor assembly is turned on and to a retracted position away from said recording disc when said motor assembly is turned off;
(h) a plate member as part of said head mounting means;
(i) at least one stop member mounted to said body member and extending adjacent to said plate member;
(j) at least one solenoid mounted on said plate member and substantially aligned with said stop member;
(k) said solenoid to act on said stop member to move said plate to said retracted position away from said recording disc when the said motor assembly is turned off and to return said plate member to said operating position when the said motor assembly is turned on; and
(l) resilient leaf members having one end connected to said plate member and a second end mounted to a stationary member within said cabinet assembly.

8. A disc file memory system as defined in claim 7, having in combination:
(a) a flow control plate mounted between said head mounting means plate and said recording disc; and
(b) said flow control plate having head openings to permit said magnetic head assembly to be positioned at said predetermined operating position in recording relationship to said recording disc.

9. A disc file memory system as defined in claim 8, having in combination:
(a) an opening in said top plate;
(b) a cover assembly positioned in said opening;
(c) said cover assembly having a cover member with a retainer knob positioned substantially at its central portion;
(d) said motor assembly having a fixed rod aligned with and eccentric with said rotating motor shaft and extending through said recording disc;
(e) said retainer knob having a bearing assembly positioned to make contact with said recording disc;
(f) said retainer knob having a threaded bore to act on a threaded end of said fixed rod;
(g) a drive plate mounted on said rotating motor shaft and making contact with said recording disc; and
(h) said retainer knob being secured on said fixed rod and securely positioning said recording disc between said bearing assembly and said drive plate.

10. A disc file memory system as defined in claim 9, having in combination:
(a) at least one locator clip positioned on said cover member and extending between said flow control plate and said recording disc; and
(b) a seal member positioned between said top plate opening and said cover member.

11. A disc file memory system as defined in claim 10, having in combination:
(a) at least two flange supports positioned on said flow control plate;
(b) bolt members having a head member on one end, a threaded tip on the other end and a guide surface connecting said head member and said threaded tip;
(c) said bolt member passing through said support flange;
(d) said support flange having an opening with a form substantially the same as said guide surface's cross-section;
(e) said bolt member having its threaded tip threaded into said plate member;
(f) a return spring acting between said plate member and said support flange to urge said flow control plate toward said top plate opening; and
(g) said locator clip acts on said flow control plate compressing said return spring and moving said flow control plate away from said top plate opening.

12. A disc file memory system as defined in claim 11 having in combination:
(a) a motor body as part of said motor assembly;
(b) a motor top plate mounted on said motor body and positioned in close proximity to said drive plate;
(c) a motor base plate mounted at the opposite end of said motor body;
(d) said motor top plate acting on and housing a secured thrust bearing located off said rotating motor shaft;
(e) a bearing support member positioned by the said motor base plate and said motor body;
(f) said bearing support member having an outer flange and an inner bearing housing connected by leaf springs;

(g) said bearing housing having a locating step and said rotating motor shaft having a support surface; and (h) a bearing assembly positioned between said support surface and locating step.

13. A disc file memory system as defined in claim 12, having in combination:

(a) at least one coil spring acting between said motor base plate and said bearing housing; and (b) said motor base plate having a load screw which can act on said coil spring to apply a predetermined pressure on said bearing housing.

References Cited

UNITED STATES PATENTS

| | | | |
|---|---|---|---|
| 3,131,395 | 4/1964 | Lekas | 340—174.1 |
| 3,135,949 | 6/1964 | Whyte | 340—174.1 |
| 3,177,493 | 4/1965 | Durlofsky | 340—174.1 |
| 3,196,422 | 7/1965 | Cheney | 340—174.1 |
| 3,225,338 | 12/1965 | Kelner et al. | 340—174.1 |

BERNARD KONICK, Primary Examiner

V. P. CANNEY, Assistant Examiner

U.S. Cl. X.R.

179—100.2; 346—68